US007757948B2

(12) United States Patent
Whewell et al.

(10) Patent No.: US 7,757,948 B2
(45) Date of Patent: Jul. 20, 2010

(54) AUTHENTICATION SYSTEM

(75) Inventors: Robert Whewell, Newbury (GB); Paul Nicholas Cox, Cambridgeshire (GB); Andrew Jonathan Gill, London (GB)

(73) Assignee: Aegate Limited, London (GB)

( * ) Notice: Subject to any disclaimer, the term of this patent is extended or adjusted under 35 U.S.C. 154(b) by 1155 days.

(21) Appl. No.: 10/555,965

(22) PCT Filed: May 10, 2004

(86) PCT No.: PCT/GB2004/002018

§ 371 (c)(1),
(2), (4) Date: Mar. 22, 2006

(87) PCT Pub. No.: WO2004/100029

PCT Pub. Date: Nov. 18, 2004

(65) Prior Publication Data

US 2006/0255130 A1 Nov. 16, 2006

(30) Foreign Application Priority Data

May 8, 2003 (GB) ................................ 0310605.1

(51) Int. Cl.
*G06F 17/60* (2006.01)

(52) U.S. Cl. ...................................... 235/385; 235/380

(58) Field of Classification Search ................. 235/585, 235/380, 462.01, 462.13, 385
See application file for complete search history.

(56) References Cited

U.S. PATENT DOCUMENTS 5,895,075 A 4/1999 Edwards
6,547,137 B1 4/2003 Begelfer et al.
7,309,011 B2 * 12/2007 He ............................ 235/385
7,312,708 B2 * 12/2007 Tano ....................... 340/572.4
2001/0045460 A1 11/2001 Reynolds et al.
2002/0067264 A1 6/2002 Soehnlen
2003/0006907 A1 1/2003 Lovegreen et al.
2003/0085276 A1 5/2003 Ogihara et al.

FOREIGN PATENT DOCUMENTS

GB 2 275 123 8/1994
GB 2 308 947 7/1997
GB 2 342 203 4/2000
JP 9-512346 12/1997
JP 2003-58775 2/2003

(Continued)

OTHER PUBLICATIONS

International Search Report for PCT/GB2004/002018 dated Oct. 18, 2004.

(Continued)

*Primary Examiner*—Daniel St. Cyr
(74) *Attorney, Agent, or Firm*—Nixon & Vanderhye P.C.

(57) ABSTRACT

An authentication system for authenticating products at point-of-release, the system including housing the products in respective containers having respective unique product identifiers, e.g., numbers or codes, storing in an authentication database data relating to the product identifiers, reading at a trusted location terminal the data from one of the product identifiers, communicating at least some of the data read from the product identifier to the authentication database and comparing data of the product identifier with data of the authentication database so as to authenticate the corresponding product.

37 Claims, 5 Drawing Sheets

FOREIGN PATENT DOCUMENTS

| | | |
|---|---|---|
| JP | 2003-67835 | 3/2003 |
| WO | 93/19445 | 9/1993 |
| WO | 97/38364 | 10/1997 |
| WO | 01/72601 | 10/2001 |
| WO | 01/95249 | 12/2001 |
| WO | 01/99063 | 12/2001 |
| WO | 03/019488 | 3/2003 |

OTHER PUBLICATIONS

UK Search Report for GB 0310605.1 dated Sep. 29, 2003.

Japanese Office Action in Japanese Appln. Ser. No. 2006-506240 mailed Sep. 15, 2009 and translation thereof.

* cited by examiner

AUTHENTICATION SYSTEM

This application is the U.S. national phase of international application PCT/GB2004/002018 filed 10 May 2004, which designated the U.S. and claims priority to GB 0310605.1 filed 8 May 2003, the entire contents of each of which are hereby incorporated by reference.

The present invention relates to an authentication system, in particular where products can be authenticated at their point-of-release, for instance, to a consumer or end user. For a patient, point-of-release could be dispensing by a pharmacist or other healthcare professional.

In a number of industries, particularly the pharmaceutical industry, problems result from products being sold or dispensed which are counterfeit, have been fraudulently obtained or are merely faulty or out of date.

Previously, industries have dealt with this problem by providing clearly marked packaging and controlling tightly the chains of distribution. More recently, supply chain industries have considered the use of radio frequency identification (RFID) and electronic product codes (EPC) for a replacement for standard bar codes. While standard bar codes, EPCs and/or RFID can include information that can be machine-read, for purposes of tracking, etc., the information used therein is not necessarily unique for the product. For example, a bar code carries general information about the product and/or the manufacturer, etc., but the same bar code with identical information is affixed or otherwise provided to multiple containers for the same type of product. Moreover, the information contained in RFID and/or EPC may not necessarily be unique to the product. See, generally, "RFID Changes Everything," E-Business Ecosystems, Sep. 19, 2002. However, problems still arise and the present application recognises for the first time the possibility of implementing a system which provides authentication of individual products. These products may be packaged individually or together in packs and authentication can then be provided for each product separately, for instance, each tablet, vial, blister strip, etc. In this specification, "authentication" can be used to refer to products which may be subject to, e.g., recall, theft and/or expiration, etc.

According to the present invention, there is provided a method of authenticating products at a trusted location including:

housing the products in respective containers having respective unique product identifiers associated with data identifying the respective housed products;

storing in an authentication database data relating to the products;

reading at a trusted location terminal the data from one of the product identifiers;

communicating at least some of the data of the product identifier to the authentication database;

comparing data of the product identifier with data of the authentication database so as to produce an authentication result; and communicating the authentication result from the authentication database to the trusted location terminal.

According to an embodiment of the present invention, there is also provided an authentication system for authenticating products at a trusted location, the products being held in respective containers, each container including a respective unique product identifier, the system including:

at least one terminal located at a trusted location of the product and for reading data from the respective product identifier;

an authentication database to store data relating to the product identifier and the respective products; and a communication channel by which data read by the at least one terminal can be compared with data stored in the authentication database so as to authenticate the corresponding product.

In this way, before a particular product, such as a pharmaceutical, is sold or dispensed, it is possible to authenticate that product. The trusted location will often be the point-of-release where the product is sold or dispensed. However, it could also be the point-of-receipt, for instance a trusted consumer or a retailer who will then sell or dispense the product.

The product identifier can include merely data uniquely identifying the individual product, with data about the product identifier being stored in the authentication database. However, the container can be provided with data about the product itself. The product identifier can be incorporated into the container for example by embedding an identification device (carrying the product identifier) into a carton or foil blister pack or adhesion of the device or a label (such as bar code) to cartons, bottle labels or caps. The appropriate comparison of data can take place either at the authentication database or at the terminal.

In this way, the system can determine whether or not the product is a genuine product or is a counterfeit. Similarly, if the product is out of date, faulty, intended for a different market or subject to recall, this can also be identified. As a result, if the product is not correctly authenticated, the sale or dispensing of the product can be inhibited.

Accordingly, it is possible to provide increased availability of products at points-of-dispensing/sale for the pharmaceutical industry, it is also possible to guarantee patients' safety with regard to counterfeit drugs and dispensing errors. Similarly, additional checks can be made at point-of-receipt.

Because details of dispensing/sale of products can be provided back to the authentication database, it is also possible to achieve improved distribution control and management information. In particular, it is possible to provide improved forecasting (profit projection and stock control unit demand), reduced inventory along the distribution channel, more cost effective supply management and determining the length of time a product has been in the supply chain.

As part of the system, according to an embodiment of the present invention, there is also provided a container for housing a product for distribution and release, the container including a unique product identifier associated with data relating to the housed product and providing said data for reading by an external device.

In one embodiment, the product identifier may be in the form of a number, e.g., a randomly generated number, a code, e.g., one or more bar codes that can be read/scanned by a scanner or other reading device at the point-of-sale terminal. The product identifier, e.g., may take the form of an RFID, unique ink (e.g., having a unique frequency, e.g., UV), magnetics, etc.

In another embodiment, the product identifier may be stored or otherwise available through a product identification device, e.g., one or more tagging devices including unique product identity codes that can be read/scanned by and/or input into the terminals. The container may include additional identification devices and/or bar-codes, in which event the terminals can read/scan both the identification devices/bar-codes and the product identifiers.

Thus, preferably, besides the unique product identifier, the terminals are also capable of reading standard prior art bar codes on the container which convey general information about the product and/or manufacture, but are not unique to the specific product.

Information from the product identifier, e.g., a number, bar-code, etc., can be provided via the communication channel to enable manufacturers, suppliers and the like to be informed automatically of the particular product for which authentication was not possible. This relieves the operator of the point-of-release, for instance a pharmacist, of the responsibility of informing the supplier. It will be appreciated that even counterfeit products are often provided with bar-codes and these codes will identify the type of product.

In this way, the product can be identified for authentication as part of the system.

The product identifier and/or identification device, etc. can be incorporated into the container for example by embedding it in a carton or foil blister pack or adhesion to cartons, bottle labels or caps.

Preferably the container is arranged to be opened in a predetermined manner and the product identifier and/or identification device, etc. is arranged to indicate that the container has been opened.

This prevents any tampering with the product, thereby further enhancing the authentication process.

The container, e.g., by way of the identification device, may be provided with some form of sensor for detecting and recording that the container has been opened. However, preferably, the product identifier or identification device, etc. is formed in or on the container such that opening the container at least partly destroys such.

Partly destroying the product identifier or identification device, etc., can be arranged to provide a signal that the container has been opened. Alternatively, the product identifier or identification device can be rendered completely inoperable such that the external reading device cannot detect the product identifier or identification device and, hence, cannot authenticate the housed product. In some embodiments, a partly destroyed product identifier or identification device could be reactivated by the manufacturer for investigation purposes.

Preferably, the product identifier includes data indicating a unique product identity code but no other information about the product. Optionally the identification device or label/bar code in which the product identifier is provided can additionally include one or more of the following types of exemplary information:

the nature or type of product housed in the container;

the date of manufacture of the product;

the name of the manufacturer;

the place of manufacture of the product;

the date of housing the product in the container;

the sell-by date;

the use-by date; and special instructions, e.g. contra-indications or warnings.

Of course, the identification device could include other information.

This information can be used to determine whether or not the product is suitable for sale or dispensing, preferably in conjunction with information provided by the authentication database.

Alternatively or additionally, such data may be stored in the authentication database and accessed by reference to data associated with the product identifier and/or identification device identifying the corresponding respective product.

Optionally, the container, e.g., by way of the identification device, includes at least one sensor for environmental conditions including one or more of temperature and humidity and stores data from which it can be determined if the product has been subjected to environmental conditions beyond a predetermined limit.

In this way, it can be determined at the point-of-sale whether or not, since leaving the manufacturer, the product has been subjected to any conditions which render it unsuitable for sale.

As part of the system, according to an embodiment of the present invention, there is also provided a terminal for use at a trusted location of products held in respective containers, each container including a respective unique product identifier, the terminal including:

- a reader for reading data relating to the product identifier;
- a communication port for communicating at least some of said data to a remote authentication database and for receiving data from the authentication database;
- a controller for providing authentication of a product on the basis of the data received from the authentication database.

In this way, the terminal is able to determine whether or not the product is suitable for sale or dispensing.

The communication port may merely transmit data identifying the product in question and, having received data from the authentication database relating to that product, conduct the comparison and authentication itself. Alternatively, comparison and authentication may take place at the authentication database on the basis of data associated with the product identifier.

Optionally, the terminal is arranged to conduct transactions relating to sales or dispensing of said products and the controller inhibits such transactions without the authentication. In this way, sale and dispensing of products is controlled by the system.

The terminal preferably communicates to the remote authentication database data relating to the terminal itself, for instance an identification code. In this way, if the terminal is stolen, it is possible to prevent authentication of products read by that terminal. In addition, the terminal preferably communicates to the remote authentication database data relating to the date and time of reading.

The terminal may include a user interface, such that the controller can indicate authentication of a product with the user interface. Alternatively or additionally, the nature or type of the product can be confirmed on the user interface on the basis of the data received from the authentication database. Audio and/or video methods can be used to signal authentication, or lack thereof.

As part of the system, according to an embodiment of the present invention, there is also provided an authentication database for authenticating products housed in respective containers, each container including a respective unique product identifier, the database including:

- a communication port for receiving from a remote terminal data relating to the product identifier and for communicating to the terminal data for authenticating the product; and
- a memory for storing for each product at least the respective product identifier, and optionally one or more of:

the nature or type of product housed in the container;

the date of manufacture of the product;

the name of the manufacturer;

the place of manufacture of the product;

the date of housing the product in the container;

the sell-by date;

the use-by date;

special instructions, e.g. contra-indications or warnings; and data regarding unauthorized terminals.

The authentication database may be provided directly by the original manufacturer or may be provided by a third party on the basis of information provided by the manufacturer.

For the pharmaceutical industry, it is possible to provide improved patient safety, for instance with reduced occurrences of incorrect dispensing against prescription (especially at hospitals). There can be a reduction in loss of revenue and profit resulting from fraudulent products (together with a reduction in the estimated loss of jobs). Due to the improved control that is available, it is possible to provide improved availability of products at the point of dispensing, improved forecasting of consumption/demand and reduced inventory throughout the distribution channel.

It is also possible to provide confirmed compliance with relevant storage and shelf-life specifications.

Aspects of invention will be more clearly understood from the following description, given by way of example only, with reference to the accompanying drawings, in which.

Figure 1:
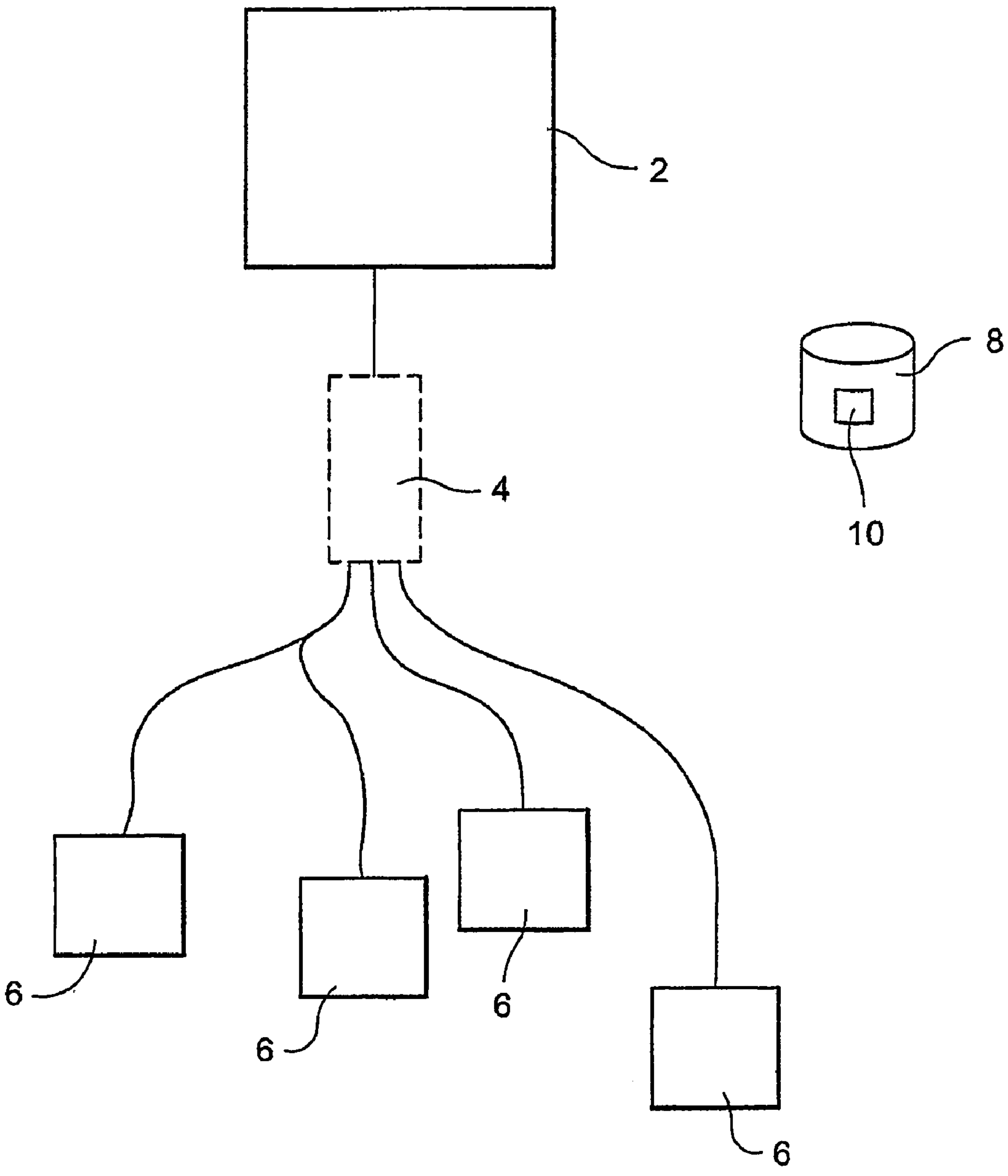
FIG. 1 illustrates schematically a system according to an embodiment of the present invention.

A system embodying an embodiment of the present invention is illustrated schematically in FIG. 1.

A central authentication database 2 is provided to store data on a plurality of individual products. The database 2 may be provided directly by a manufacturer of those products or may be provided by a third party with the relevant information being obtained from the manufacturer.

A communication channel 4 allows communication between the authentication database 2 and the plurality of terminals 6. The communication channel may be embodied in any suitable manner, for instance wireless or land telecom line.

Channel 4 can be any known or later developed device or system for connecting the terminal 6 to the authentication database 2, including a direct cable connection, a connection over a wide area network or a local area network, a connection over an intranet, a connection over the Internet, or a connection over any other distributed processing network or system. In general, the channel 4 can be any known or later developed connection system or structure usable to connect the terminal 6 to the authentication database.

The terminals 6 are provided at locations where the products in question are finally released to the consumers, either by way of sale of the products or merely dispensing them.

Each of the products is provided in a container 8 having a unique product identifier 10, e.g., a number or code that is associated with the particular product placed in the container. The product identifier can be machine-readable, or it can simply be a code that is manually input at terminal 6. The product identifier may be in the form of one or more bar codes or an identification device programmed with or otherwise associated with the product identifier. Preferably, the product identifier includes only a number or bar code placed on or in the container. Of course, other machine-readable media that can convey or carry the product identifier are contemplated, e.g., RFIDs, EPCs, magnetics, unique inks, etc.

Moreover, it is preferred that the product identifier 10 simply includes a unique identification for the container and/or the contained product without any additional information. For example, the product identifier may not include information about the product housed in the container. However, information about the product may be associated with the product identifier, for instance contained in the same bar-code or identification device or provided in a separate bar-code or identification device.

The terminals 6 are each able to read or scan data from the product identifier 10 so as to validate the authenticity of the housed product.

At the point where the product is being dispensed or sold to the consumer, the product identifier 10 is read by the terminal 6. By means of the communication channel 4, the terminal 6 can communicate with the authentication database 2 so as to confirm, or not, the authenticity of the container 8 and housed product. Dispensing/sale can be authorised or not.

Having obtained authentication and authorisation, the product can then be dispensed or sold.

The system may also be arranged such that, upon dispensing, the authentication database 2 communicates with the manufacturers, distributors, retailers, etc. to arrange billing and replenishment of the product.

Figure 2:
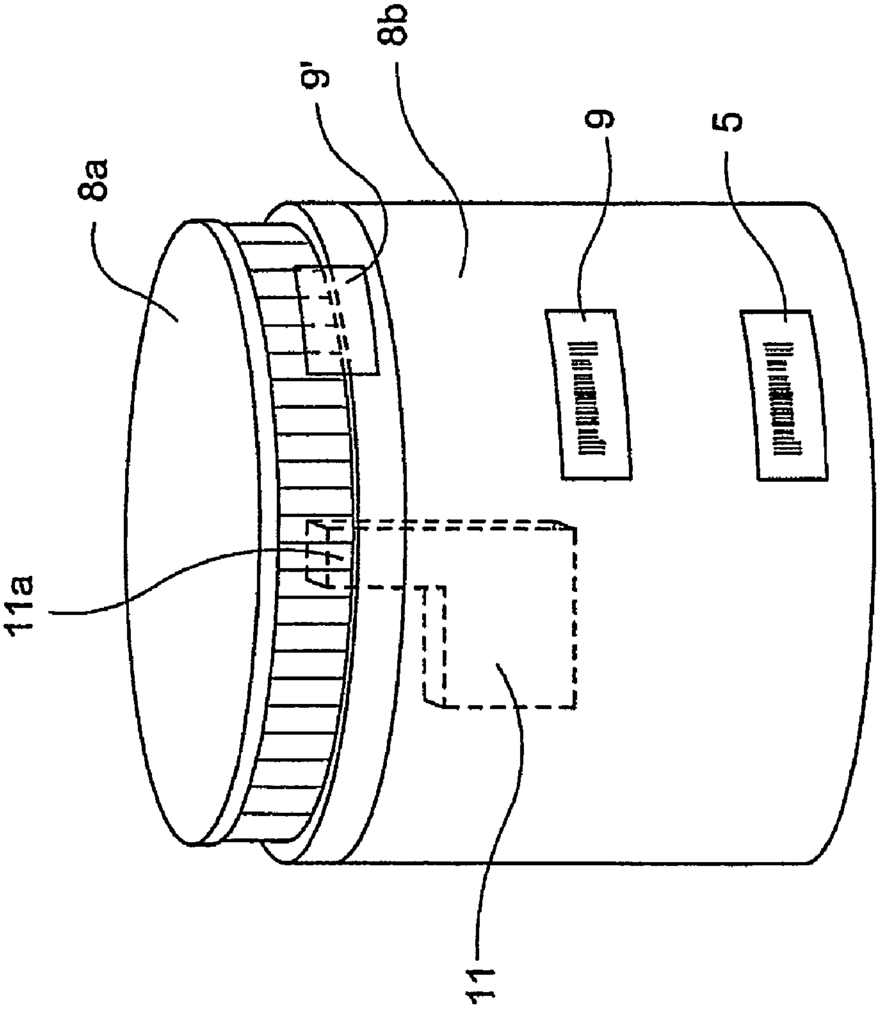
FIG. 2 illustrates schematically a container including a unique machine-readable identifier according to an embodiment of the present invention.

The containers for the product may be embodied in a number of different ways. FIG. 2 illustrates schematically a pot of the type used for housing pharmaceutical tablets. In particular, a cap 8*a* is attached to a base 8*b* by means of a screw thread. In the illustrated embodiment, the cap 8*a* and base 8*b* are formed from moulded plastic. FIG. 2 also shows that the pot may include an information tag, e.g., a standard bar code 5, which may include general information about the product or manufacturer, but not unique data regarding the security of the product or container.

Thus, in accordance with a preferred embodiment, the product identifier may include only security information without any product information, while the standard bar code 5 or some other identification device provides information about the product, e.g., manufacturer, dosage, expiration, recalls, etc.

In one embodiment, the unique product identifier 10 includes a number or a bar code 9 provided on a label or tag. If the product identifier is a number, the number may be machine-readable, or it may be simply input into point-of-release terminal 6. In another embodiment, the unique product identifier 10 is in the form of an identification device, e.g., a tagging device 11. In still another embodiment, shown in FIG. 2, the identification device includes both a bar code 9 and/or a tagging device 11. Terminals 6 can scan/read either the bar code 9 and/or the tagging device 11.

The identification device 11 includes a memory for storing, in a preferred mode, only the product identifier, to uniquely identify the housed product. However, it is contemplated that the identification device 11 can store or have access to additional information about the product and container. This data can be read by an external device, e.g., terminal 6.

As illustrated in FIG. 2, the identification device 11 includes a portion 11*a* which extends from the base 8*b* into the cap 8*a*. Thus, when the cap 8*a* is rotated relative to the base 8*b* to open the container 8, the extension 11*a* of the identification device 11 is sheared and broken from the identification device 11. Alternatively, or in addition, bar code 9' can be positioned on containers such that twisting of cap 8*a* shears bar code 9'.

The identification device 11 can be configured such that shearing of the extension 11*a* changes data within the identification device 11 or at least changes the nature of the signal which will be read by an external reader. In this way, the external reader can determine that the container 8 has been opened. Usually, this will result in the system failing to authenticate and authorise the product for sale or dispensing. In the simplest embodiment, shearing of the extension 11*a* or bar code 9' will merely destroy the product identifier 10, such that no authentication can be achieved.

There are a variety of reasons why a unique product identifier approach is preferable to using the EPC coding format.

1. The EPC format has within it information regarding the product and a person reading the tag can infer information about the product. This is regarded as a privacy issue, particularly when associated with pharmaceuticals. For example, during a job interview the potential employer notices that the potential employee has anti-cancer drugs in his pocket and therefore an offer is not extended to the applicant, etc. A unique product identifier has no value without the database which associates the number, e.g., to some information.
2. Although the EPC format has a serial number element, it is much shorter than if a unique product identifier approach is used. This means that for very large volumes there is added complexity in managing the data. Moreover, the EPC is not necessarily unique to the product.
3. Unique product identifiers are made unique at time of manufacture, whereas EPC relies on the manufacturer of the products to program them uniquely. This presents a weakness when they are used for security scenarios.
4. EPC tags will by their definition allow counterfeiters to anticipate to some degree what valid serial numbers will be and program tags with those numbers. Unique product identifiers could be used in a "random" order to prevent the prediction of valid codes. Also they cannot be soft programmed. This means that in order to make valid copies a counterfeiter would have to buy one product for everyone he wanted to copy in order to obtain another valid identifier. This severely reduces the value of counterfeiting the products.

In one preferred embodiment, a pharmaceutical company incorporates a product identifier, e.g., a unique identification number or code, into each pack or individual blisters within each pack on the manufacturing line. This number, along with any other relevant instructions such as expiry dates, is transferred electronically into a third party secure database.

At the point of dispensing, e.g., at terminals 6, products are placed on a scanner which connects securely to the database to verify the unique product identifier, e.g., number, stored in the database. An electronic response is sent to the pharmacist confirming or rejecting the authenticity of product. Other relevant information may be supplied such as reason for authenticity failure, e.g., product recall. Moreover, the manufacturer may post supplemental information to the authentication database, even after the product has been shipped. For example, the authentication database can periodically or on demand (via a prompt from the terminal) send late-supplied information to terminals, thereby avoiding the need for the manufacturer to send individual notice to each distributor in the supply chain. The pharmacist then decides whether to dispense or not taking into account the feedback received.

The service does not change or rely on the current distribution chain for successful operation and the service is independent of the scanners used at terminals, i.e., scanners are able to cope with a variety of tag types (including RFID or EPC). This leaves pharmaceutical companies the choice of the most appropriate technology and distribution solution for their products. Also, the manufacturer gains influence over the supply of the product.

It should be appreciated that similar product identifiers can be included in containers of any suitable form.

The container preferably only includes the product identifier. However, the container, by way of a bar-code and/or identification device, can include data indicating the nature or type of product within the container, the date of manufacture of the product, the name of the manufacturer, the place of manufacture of the product, the date of housing the product in the container, the sell-by date and the use-by date. It is also possible to store any other data of relevance or use in the distribution of the product in question.

In one embodiment, the container, e.g. by way of an identification device, can include one or more sensors to detect environmental conditions such as temperature and humidity.

The identification device can record the environmental conditions as an on-going profile. Alternatively, the identification device could merely record when the environmental conditions exceed a predetermined limit.

In this way an external reader is able to determine the conditions to which the product has been subjected between manufacture and sale or dispensing. If the product has been subjected to conditions beyond predetermined limits, authentication may be refused.

Figure 3:
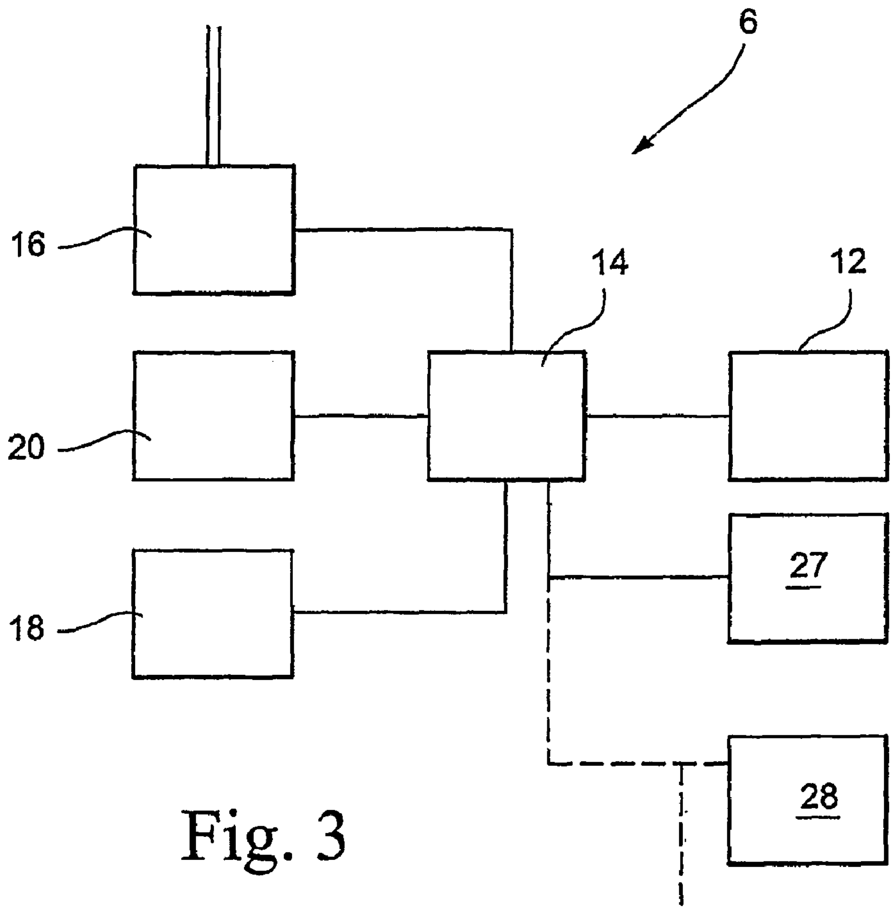
FIG. 3 illustrates schematically a terminal according to an embodiment of the present invention.

As illustrated in FIG. 3, each terminal 6 is provided with a scanner or reader 12 by which the product identifier 10 can be read. Reader 12 can read/scan data from the product identifier, e.g., from the bar code 9 or identification device 11, and preferably the reader 12 can read/scan data from both the bar code 9 and the identification device 11. A controller 14 may then communicate some or all of this data to the authentication database 2 by means of a communication port 16.

In one embodiment, it may be sufficient for the controller 14 to transmit to the authentication database 2 only data sufficient to identify the product in question. The authentication database 2 could then communicate back to the controller 14 any information stored by the authentication database relating to that product. The controller 14 could then make any necessary comparisons to determine whether or not the product can be authenticated and authorised for sale or dispensing. A user interface 18 may be provided to indicate to the user information regarding the product. Also, a memory 20 may be provided to store data from the product identifier 10 and/or authentication database 2 or merely to assist in the processing of the controller 14.

In another embodiment, a range of scanning devices, e.g., 27, 28, etc., may be connected which employ various scanning methods, e.g., RFID, EPC, imaging devices, magnetic materials, unique inks, etc.

In a preferred embodiment, controller 14 sends to the authentication database 2 other data obtained or read from the bar-code 9 and/or identification device 11. The authentication database 2 can then carry out the necessary comparisons and authentication. In this case, the controller 14 may merely receive from the authentication database 2 information regarding authentication.

As indicated above, by communicating data in this way, the system may give rise to other advantages with regard to monitoring where and when products are being sold and/or dispensed.

In one embodiment, at least some of the information read from the bar-codes 5 can be transmitted with data from the product identifier 10. In this way, even if authentication cannot be achieved, for instance where the product is counterfeit or repackaged in a container without a product identifier, the system can still automatically identify from the bar-code 5, the nature of the product.

Figure 4:
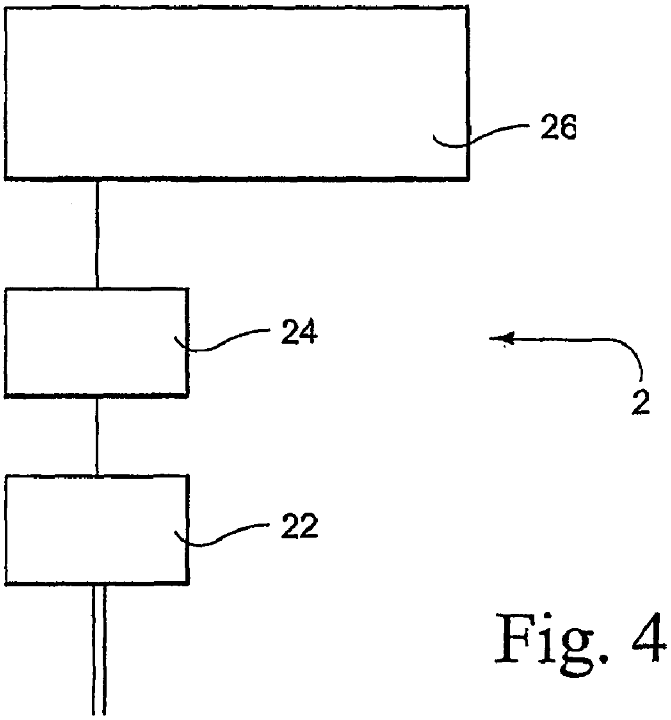
FIG. 4 illustrates schematically an authentication database according to an embodiment of the present invention.

An embodiment of an authentication database 2 is illustrated schematically in FIG. 4.

A communication port 22 allows communication with a plurality of terminals 6. It may also allow communication with manufacturers for receiving data regarding their products.

A controller 24 interfaces with a memory 26. Having received data from a terminal 6 identifying a particular product, the controller 24 could merely retrieve the corresponding data for that product from the memory 26 and transmit it back to the terminal 6 via the communication port 22. However, in a preferred embodiment, the controller 24 makes use of additional data read from the container of the product (for instance from a bar code or identification device) and communicated by the terminals 6 so as to conduct the authentication process. The controller 24 can then transmit authentication information to the relevant terminal 6 by means of the communication port 22.

As mentioned above, the controller 24 may also make use of the data so as to provide additional information regarding the sale or dispensing of the products.

As described above, a comparison between data from the authentication database and the data from the scanned, read and/or input unique product identifier are compared to determine authentication of the product.

In yet another embodiment, the terminal and/or the authentication database can have access to data from yet another source, e.g., a third party such as a database of the Food and Drug Administration (FDA), EMEA or NPSA. Other examples of third parties include other entities within the supply chain. For example, if a container with drugs is scanned at a point-of-release terminal, the data channel 4 and/or the authentication database 2 can have access to data from a third party which may indicate that the product is defective or not fit for consumption. For example, the third party data could indicate that the product should have been maintained at a set temperature, but that the refrigerator malfunctioned and there is a possibility that the set temperature was exceeded. In this case, it might be appropriate to not authenticate the product. As another example, the third party data may indicate that the product is restricted for sale in a certain geographical location, e.g., sample stock not intended for resale.

The memory 26 may store for each product data indicating the nature or type of the product housed in the container, the date of manufacture of the product, place of manufacture of the product, the date of housing the product in the container, the sell-by date and the use-by date.

Figure 5:
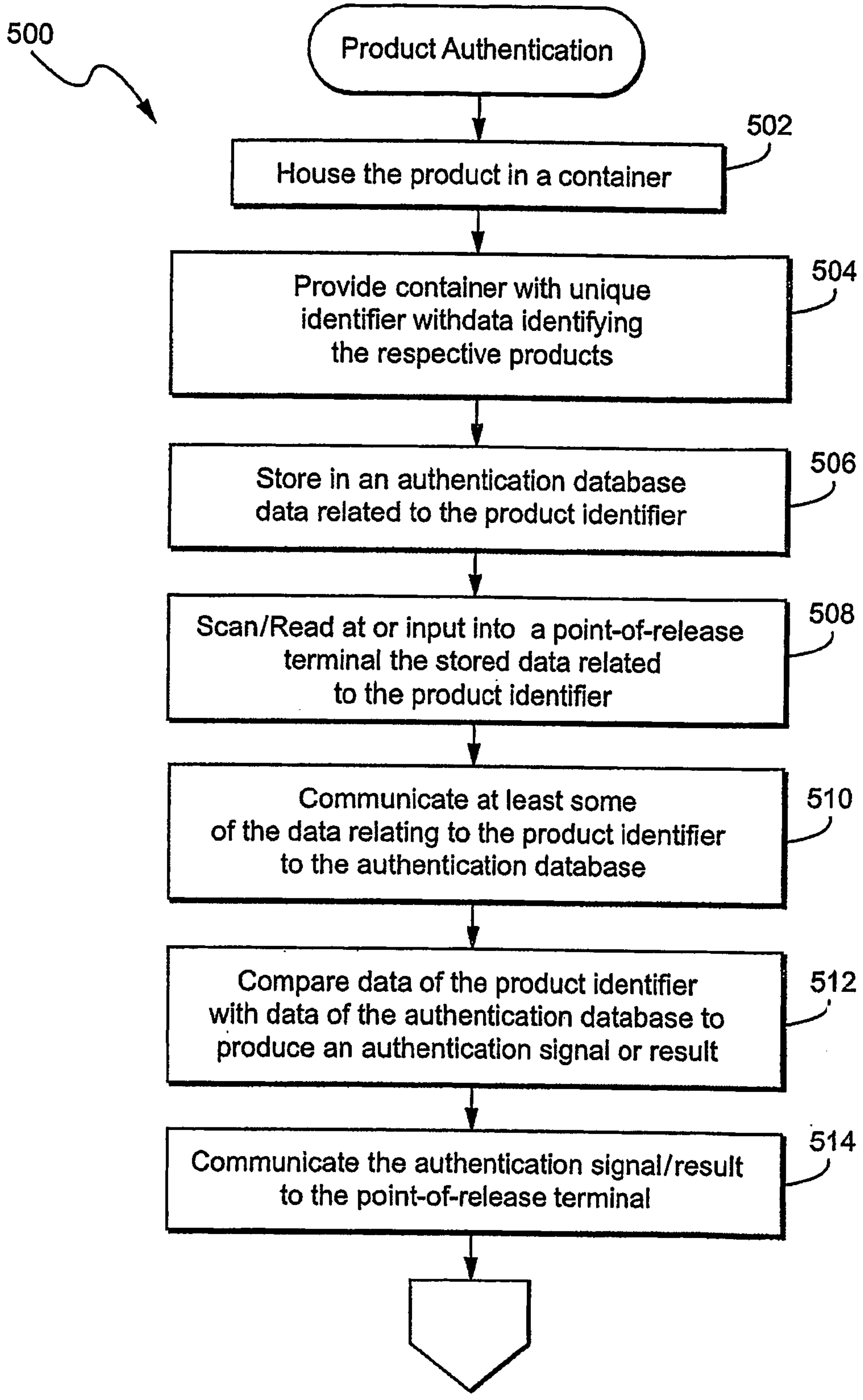
FIGS. 5-7 are exemplary flow charts according to embodiments of the present invention.

FIG. 5 illustrates a flow chart with one exemplary process for product authentication. Step 502 includes placing the product in a container. Step 504 includes providing the container with a unique identifier with data identifying the respective products. Such data may include the product manufacturer, the date and time of manufacture, or other traceability data. Preferably, the product identifier is placed in or on the container by the manufacturer when the product is placed therein. Application of the unique product identifiers should be performed in a trusted location, under the control of the manufacturers. Step 506 includes storing in an authentication database data related to the product identifiers. The storing of the unique product identifiers should be performed in a similar trusted location within the manufacturer's control. Step 508 includes scanning/reading at a point-of-release terminal the stored data relating to the product identifier. Step 510 includes communicating at least some of the data relating to the product identifier to the authentication database. Step 512 includes comparing data of the product identifier with data from the authentication device to produce an authentication result or signal. Step 512 may be performed at central authentication database 2 or any one of terminals 6, as shown in FIG. 1. Step 514 includes communicating the authentication signal or result to the point-of-release terminal. The authentication signal or result may be in the form of an audio or visual signal to the operator of the terminal 6.

Figure 6:
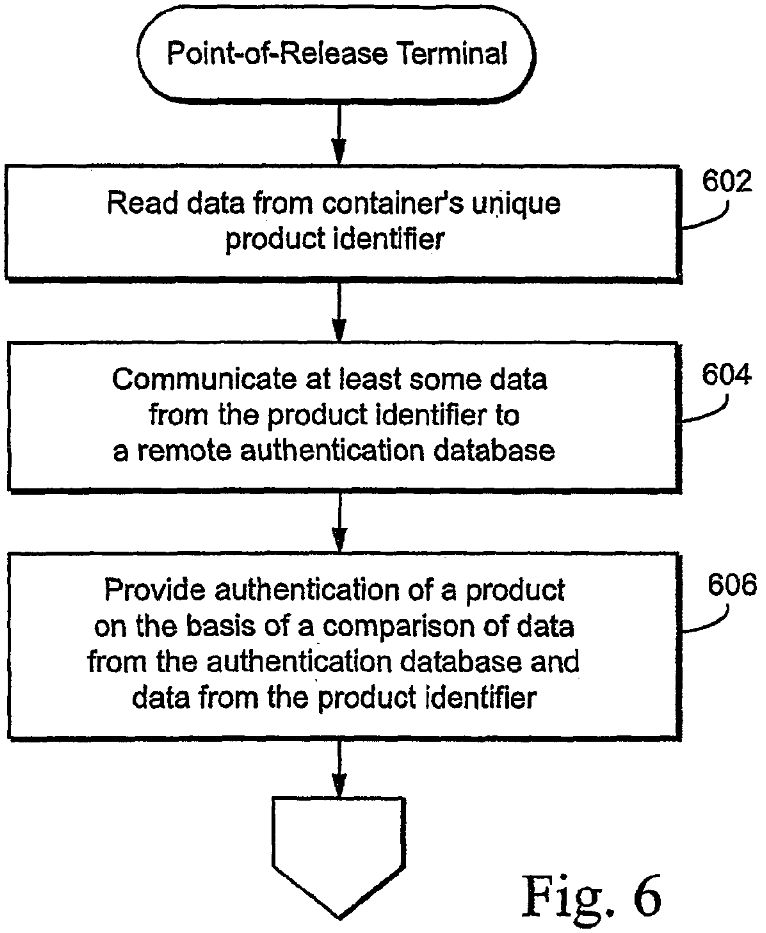

FIG. 6 illustrates a flow chart of an exemplary form of operation for a point-of-release terminal. Step 602 includes reading data from a container's unique product identifier. In step 604, at least some of the data from the product identifier is communicated to a remote authentication database. In step 606, authentication of a product is provided on the basis of a comparison of data from the authentication database and data from the product identifier. The comparison step can take place either at the remote authentication database, or at the point-of-release terminal 6.

Figure 7:
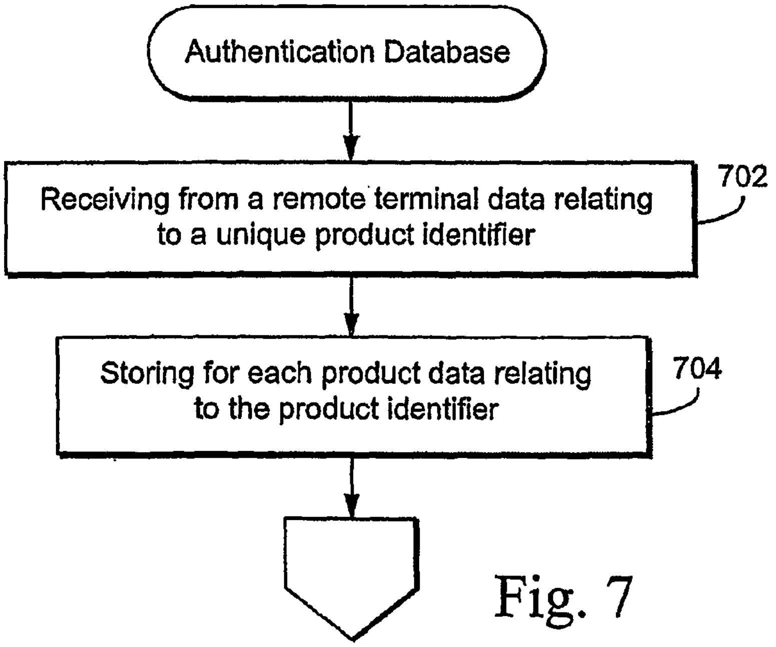

FIG. 7 is a flow chart illustrating an exemplary form of operation of the authentication database. In step 702, the authentication database receives data relating to a unique product identifier from a remote terminal 6. Alternatively, the authentication database in step 702 can merely receive a request from a point-of-release terminal that information regarding the unique product identifier be sent back to point-of-release terminal 6. In this event, the authentication database would simply provide the requested information back to point-of-release terminal 6, without conducting the comparison, which will be performed at point-of-release terminal 6.

In step 704, data relating to the product identifier is stored for each respective product.

As shown in FIG. 1, the authentication system is preferably implemented on a programmed general purpose computer. However, the authentication system (or its subcomponents) can also be implemented on a special purpose computer, a programmed microprocessor or microcontroller and peripheral integrated circuit elements, an ASIC or other integrated circuit, a digital signal processor, a hardwired electronic or logic circuit such as a discrete element circuit, a programmable logic device such as a PLD, PLA, FPGA or PAL, or the like. In general, any device, capable of implementing a finite state machine that is in turn capable of implementing the described systems, methods and the flowcharts shown in FIGS. 5-7, can be used to implement the authentication system.

The flow charts of FIGS. 5-7, or portions thereof, can be programmed onto a machine-readable recording medium, e.g., compact or floppy disks, etc. that includes a control program for controlling a data processor, e.g., controllers 14 (FIG. 3) or 24 (FIG. 4). Moreover, upgrades at terminals 6 may be initiated by sending such recording medium to the terminals. Alternatively, or in addition, upgrades to the control program can be sent electronically to the terminals.

Aspects of the invention have been described in relation to preferred embodiments thereof, which are intended to be illustrative, and not limiting. Variations and/or modifications all within the scope of the invention will be apparent to those of ordinary skill in the art.

The invention claimed is:

1. A container for housing a product for distribution and release, the container including at least one electronic product identifier having or conveying data, said data identifying the housed product and including security information concerning security of the container, the electronic product identifier providing said data for reading by an external device, wherein the electronic product identifier includes a first portion disposed in a base of the container, and a second portion which extends from the base of the container into the top of the container.

2. The container according to claim 1, wherein: the container is arranged to be opened in a predetermined manner and the electronic product identifier is arranged to indicate that the container has been opened.

3. The container according to claim 2, wherein the electronic product identifier is formed in or on the container such that opening the container at least partly destroys the product identifier.

4. The container according to claim 1, including additional data indicating one or more of: the nature or type of product housed in the container; the date of manufacture of the product; the name of the manufacturer; the place of manufacture of the product; the date of housing the product in the container; the sell-by date; the use-by date; and specials instructions.

5. The container according to claim 1, further comprising at least one sensor for environmental conditions including one or more of temperature and humidity and stores data from which it can be determined if the product has been subjected to environmental conditions beyond a predetermined limit.

6. The container according to claim 1, wherein the data included on the electronic product identifier is a number, preferably a randomly generated number.

7. The container according to claim 1, wherein the electronic product identifier is stored or otherwise accessible via an identification device provided to the container.

8. The container according to claim 7, wherein the identification device is a tagging device.

9. The container according to claim 1, wherein in use the second portion is broken from the first portion when the container is opened.

10. The container according to claim 9, wherein when the second portion is broken from the first portion due to opening of the container, the security information concerning security of the container is changed.

11. A terminal for use at a point-of-release of products held in respective containers, each container including at least one respective electronic product identifier for storing data, the terminal including: a reader for reading said data from the electronic product identifier, said data including security information concerning security of the container; a communication port for communicating at least some of said data to a remote authentication database and for receiving data from the authentication database; and a controller for providing authentication of a product on the basis of the data received from the authentication database, wherein the electronic product identifier includes a first portion disposed in a base of the container, and a second portion which extends from the base of the container into the top of the container.

12. The terminal according to claim 11, wherein: the terminal is arranged to conduct transactions relating to release of said products and the controller inhibits such transactions without said authentication.

13. The terminal according to claim 11, further including a user interface.

14. The terminal according to claim 13, wherein: the controller indicates authentication of a product with the user interface.

15. The terminal according to claim 13, wherein: the nature or type of the product is confirmed on the user interface on the basis of data received from the authentication database.

16. The terminal according to claim 11, wherein in use the second portion is broken from the first portion when the container is opened.

17. The terminal according to claim 16, wherein when the second portion is broken from the first portion due to opening of the container, the security information concerning security of the container is changed causing authentication to not be provided by the controller.

18. An authentication database for authenticating products housed in respective containers, each container including a respective electronic product identifier for storing data, the database including: a communication port for receiving from a remote terminal said data relating to the product identifier of a corresponding product and for communicating to the terminal said data for authenticating the product, said data including security information concerning security of the container; and a memory for storing for each said data relating to the respective product identifier and optionally for indicating one or more of: the nature or type of product housed in the container; the date of manufacture of the product; the name of the manufacturer; the place of manufacture of the product; the date of housing the product in the container; the sell-by date; the use-by date; special instructions; and data regarding unauthorized terminals, wherein the electronic product identifier includes a first portion disposed in a base of the container, and a second portion which extends from the base of the container into the top of the container.

19. The authentication database according to claim 18, wherein in use the second portion is broken from the first portion when the container is opened.

20. The authentication database according to claim 19, wherein when the second portion is broken from the first portion due to opening of the container, the security information concerning security of the container is changed causing authentication to not be provided by the controller.

21. A method of authenticating products at a trusted location, said products having been previously housed in respective containers having respective electronic product identifiers storing data including security information concerning security of the respective containers,~said data stored on the electronic product identifiers relating to the unique electronic product identifiers having been previously stored in an authentication database including data relating to the products, said method comprising: reading at a trusted location terminal the data from one of the electronic product identifiers including the security information; communicating at least some of the data read from the electronic product identifier to the authentication database; comparing data of the electronic product identifier with data of the authentication database so as to produce an authentication result; and communicating the authentication result from the authentication database to the trusted location terminal, wherein the electronic product identifier includes a first portion disposed in a base of the container, and a second portion which extends from the base of the container into the top of the container.

22. The method according to claim 21 further comprising: communicating to the authenticating database data identifying the trusted location terminal and optionally the date and time; and comparing the data identifying the trusted location terminal with data regarding unauthorized terminals as part of producing the authentication result.

23. The method of claim 21, wherein in use the second portion is broken from the first portion when the container is opened.

24. The method of claim 23, wherein the second portion is broken from the first portion when the container is opened.

25. A recording medium on which is recorded a control program for controlling a data processor used in conjunction with a trusted location terminal of an authentication system, the recording medium including machine-readable instructions for causing the data processor to read, receive or scan data from an electronic product identifier provided on a product container, the data including security information concerning security of the product container; communicate at least some data from the electronic product identifier to a remote authentication database; and provide authentication of a product on the basis of a comparison of data from the authentication database and data from the electronic product identifier, wherein the electronic product identifier includes a first portion disposed in a base of the container, and a second portion which extends from the base of the container into the top of the container.

26. The recording medium of claim 25, wherein in use the second portion is broken from the first portion when the container is opened.

27. The recording medium of claim 26, wherein the second portion is broken from the first portion when the container is opened.

28. A method of authenticating a product comprising: providing at least one electronic product identifier to a container of the product, the electronic product identifier including security information concerning security of the container; and storing the electronic product identifier in an authentication database so that an authentication result can be provided to a remote trusted location terminal, wherein the electronic product identifier includes a first portion disposed in a base of the container, and a second portion which extends from the base of the container into the top of the container.

29. The method of authenticating a product according to claim 28, further comprising providing supplemental information to the authentication database after the container with product has been shipped, said supplemental information being provided as part of the authentication result.

30. The method of authenticating a product according to claim 28, further comprising providing third party information to the authentication database, as part of the authentication result.

31. The method of authenticating a product according to claim 28, wherein the electronic product identifier has no value without access to the authentication database.

32. The method of authenticating a product according to claim 28, wherein the electronic product identifier may not be soft programmed.

33. The method of authenticating a product according to claim 28, wherein the electronic product identifier includes a unique number and/or code.

34. The method of authenticating a product according to claim 28, wherein, upon dispensing, the authentication database communicates with one or more parties within the supply chain to arrange for billing and/or replenishment of the product.

35. The method of authenticating a product according to claim 28, wherein the electronic product identifier includes only security information without information about the product.

36. The method of claim 28, wherein in use the second portion is broken from the first portion when the container is opened.

37. The method of claim 36, wherein the second portion is broken from the first portion when the container is opened.

* * * * *